United States Patent
Kurosawa et al.

(10) Patent No.: US 8,587,173 B2
(45) Date of Patent: Nov. 19, 2013

(54) MOTOR, MOTOR SUPPORT MEMBER AND MOTOR SUPPORT METHOD

(75) Inventors: Shinya Kurosawa, Toyota (JP); Kazuhiko Arai, Inagi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 427 days.

(21) Appl. No.: 12/921,983

(22) PCT Filed: Mar. 10, 2009

(86) PCT No.: PCT/JP2009/054525
§ 371 (c)(1),
(2), (4) Date: Sep. 10, 2010

(87) PCT Pub. No.: WO2009/113527
PCT Pub. Date: Sep. 17, 2009

(65) Prior Publication Data
US 2011/0025155 A1 Feb. 3, 2011

(30) Foreign Application Priority Data

Mar. 11, 2008 (JP) ................................. 2008-061486

(51) Int. Cl.
*H02K 5/24* (2006.01)
*H02K 37/24* (2006.01)
*F16F 15/08* (2006.01)

(52) U.S. Cl.
USPC .................................. 310/91; 310/51; 310/89

(58) Field of Classification Search
USPC ................................................ 310/51, 91, 89
IPC ...................................................... H02K 5/24
See application file for complete search history.

(56) References Cited

U.S. PATENT DOCUMENTS

| | | | | |
|---|---|---|---|---|
| 3,270,221 A | * | 8/1966 | Shaffer | 310/51 |
| 3,787,014 A | * | 1/1974 | Story et al. | 248/558 |
| 3,941,339 A | * | 3/1976 | McCarty | 248/603 |
| 4,425,813 A | * | 1/1984 | Wadensten | 74/87 |
| 4,452,417 A | * | 6/1984 | Krafthefer et al. | 248/604 |
| 4,587,863 A | * | 5/1986 | Wadensten | 74/87 |
| 5,364,062 A | * | 11/1994 | Doyle et al. | 248/674 |
| 5,945,756 A | * | 8/1999 | Periyathamby et al. | 310/89 |
| 5,969,447 A | * | 10/1999 | Periyathamby et al. | 310/89 |
| 6,045,112 A | * | 4/2000 | Kirkwood | 248/634 |
| 7,301,253 B2 | * | 11/2007 | Tang et al. | 310/91 |
| 2005/0264115 A1 | * | 12/2005 | Su | 310/89 |
| 2006/0255671 A1 | * | 11/2006 | Tang et al. | 310/89 |
| 2012/0293027 A1 | * | 11/2012 | Sakurada et al. | 310/89 |

FOREIGN PATENT DOCUMENTS

| | | |
|---|---|---|
| JP | 5-304742 A | 11/1983 |
| JP | 1-071964 U | 5/1989 |
| JP | 3-061775 U | 6/1991 |
| JP | 9-317824 A | 12/1997 |

* cited by examiner

*Primary Examiner* — Terrance Kenerly
(74) *Attorney, Agent, or Firm* — Foley & Lardner LLP

(57) ABSTRACT

Provided is an intermediate member which is arranged between a motor housing (4) and a transmission case (2) and which has multiple motor housing supporting point positions (A) and transmission case supporting point positions (B). The intermediate member is coupled to the motor housing (4) at the motor housing supporting point positions (A). The transmission case supporting point positions (B) are each arranged in an angular region formed between a motor housing supporting line (C) and a motor housing supporting center line (D) which is the center between the motor housing supporting line (C) and another motor housing supporting line (C) adjacent thereto.

6 Claims, 11 Drawing Sheets

(b)

(c)

(b)

(c)

(a)

(b)

MOTOR, MOTOR SUPPORT MEMBER AND MOTOR SUPPORT METHOD

TECHNICAL FIELD

The present invention relates to a motor, a motor support member and a motor support method in which a stator-side member of the motor is fixed to a motor attachment member.

BACKGROUND ART

Japanese Patent Application Publication No. Hei 5-304742 discloses a supporting structure in which spring rods are arranged in portions corresponding to nodes in a ring vibration mode of a rotary electrical apparatus, and in which an iron core of a stator is connected to an outer circumferential plate with these spring rods.

SUMMARY OF INVENTION

[Technical Problem]

The above supporting structure has the following problem. In a ring zeroth-mode vibration in which no node of vibration is formed, the vibration is transmitted to the spring rods. In addition, in a ring high-mode vibration in which many nodes and anti-nodes are formed, a distance between a node and an anti-node of vibration is so short that the spring rods are located also at portions where the amplitude of vibration is high. Consequently, the vibration is transmitted to the spring rods.

The present invention has been made in view of the above problem. An object of the invention is to provide a motor, a motor support member and a motor support method which are capable of preventing transmission of vibration from a stator-side member to a motor-attachment-member side in any-numbered mode of ring vibration.

[Solution to Problem]

In order to achieve the above object, a center line is set in the present invention, which evenly divides an included angle made by: one of stator-side supporting lines each connecting stator-side support members supporting a stator-side member with the rotation center of a rotor-side member; and another stator-side supporting line adjacent to the one stator-side supporting line.

Motor-attachment-member-side support members are arranged in an intermediate member within angular regions each formed between the center line and the one stator-side supporting line.

BRIEF DESCRIPTION OF DRAWINGS

FIG. 1 is an exploded perspective view showing a configuration of a motor according to Embodiment 1 of the present invention.
FIG. 2 is a cross-sectional view shown by a plane including a rotation axis of a motor in Embodiment 1.
FIG. 3 is a front view of a ring in Embodiment 1.
FIG. 4 is a diagram explaining vibration occurring in a motor housing in Embodiment 1.
FIG. 5 is a diagram explaining vibration occurring in the ring in Embodiment 1.
FIG. 6 is a diagram explaining the vibration occurring in the ring in Embodiment 1.
FIG. 7 is a diagram explaining the vibration occurring in the motor housing and the ring in Embodiment 1.
FIG. 8 is an exploded perspective view showing a configuration of a motor according to Embodiment 2 of the present invention.
[FIG. ]
FIG. 10 is an exploded perspective view showing a configuration of a motor according to Embodiment 3 of the present invention.
FIG. 11 is a cross-sectional view shown by a plane including a rotation axis of a motor in Embodiment 3.
FIG. 12 is a front view of a ring according to Another Embodiment 1 of the present invention.
FIG. 13 is a front view of a ring according to Another Embodiment 2 of the present invention.
FIG. 14 is a front view of a ring according to Another Embodiment 3 of the present invention.
FIG. 15 is an exploded perspective view showing a configuration of a motor according to Another Embodiment 4 of the present invention.
FIG. 16 is a cross-sectional view shown by a plane including a rotation axis of a motor according to Another Embodiment 5 of the present invention.
FIG. 17 is a cross-sectional view shown by a plane including a rotation axis of a motor according to Another Embodiment 6 of the present invention.

DESCRIPTION OF EMBODIMENTS

Figure 1:
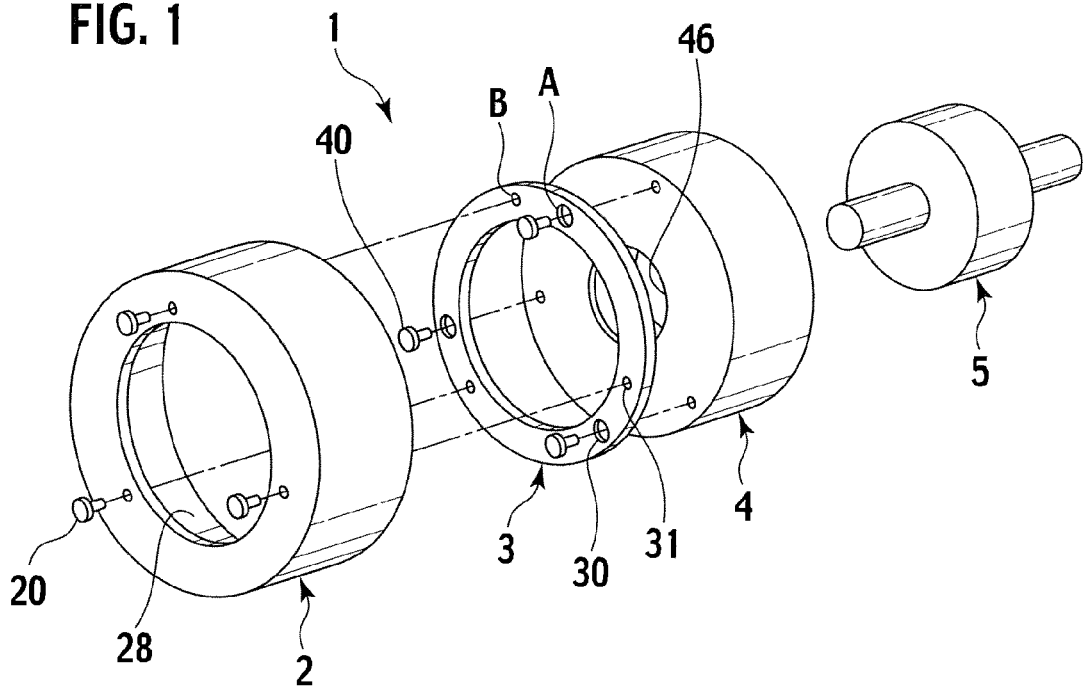
[FIG. 1]

Hereinbelow, best modes for achieving a motor, a motor support member and a motor support method of the present invention will be described while referring to the drawings. Note that, for the purpose of convenience in the following descriptions, the left side in each of the drawings of FIG. 1, FIG. 2, FIG. 8, FIG. 10, FIG. 11, and FIG. 15 to FIG. 17 is referred to as a front or a front side of a motor, and the right side therein is referred to as a rear or a rear side of the motor.
<Embodiment 1>

Figure 2:
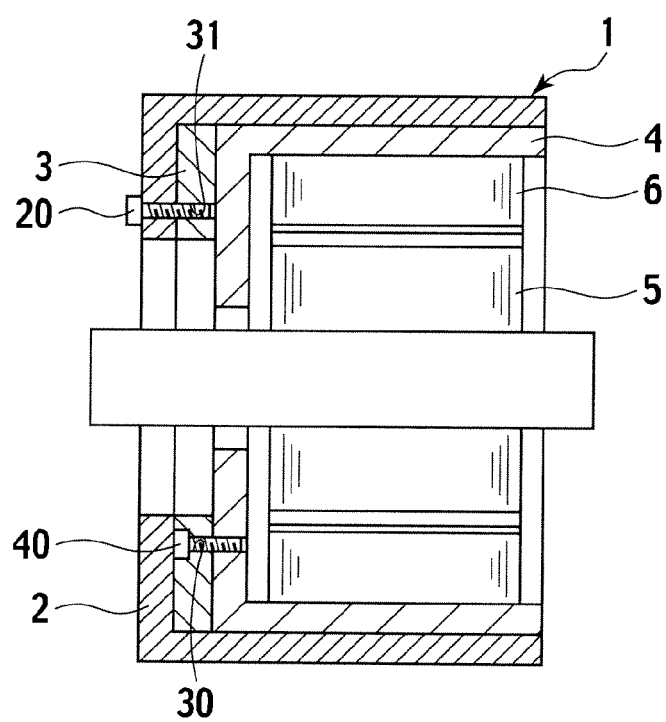
[FIG. 2]

A motor 1 according to Embodiment 1 of the present invention is a motor mounted on a vehicle, as shown in FIG. 1 and FIG. 2. The motor 1 includes a transmission case 2, a motor housing 4, a rotor 5 and a ring 3. The transmission case 2 is provided for fixing the motor 1 to a vehicle-side member. The motor housing 4 has a stator 6 on an inner circumferential surface of the motor housing 4. The rotor 5 rotates relative to the stator 6. The ring 3 is arranged between the motor housing 4 and the transmission case 2, and provided for fixing the motor housing 4 to the transmission case 2. Note that the transmission case 2 corresponds to a motor attachment member of the present invention, the motor housing 4 and the stator 6 each correspond to a stator-side member of the present invention, the rotor 5 corresponds to a rotor-side member of the preset invention, and the ring 3 corresponds to an intermediate member of the present invention.

The motor housing 4 is formed into a shape of a closed-bottom cylindrical cup having a bottom wall portion on the front side of the motor 1. A through-hole 46 into which a shaft of the rotor 5 is inserted is provided in the bottom wall portion of the motor housing 4. The stator 6 is fixed on an inner circumferential surface of the motor housing 4. The rotor 5 is accommodated inside the stator 6.

The transmission case 2 is formed into a shape of a closed-bottom cylindrical cup having a bottom wall portion on the front side of the motor 1. A through-hole 28 into which the shaft of the rotor 5 is inserted is provided in the bottom wall portion of the transmission case 2. The ring 3 and the motor housing 4 are accommodated inside the transmission case 2.

Figure 3:
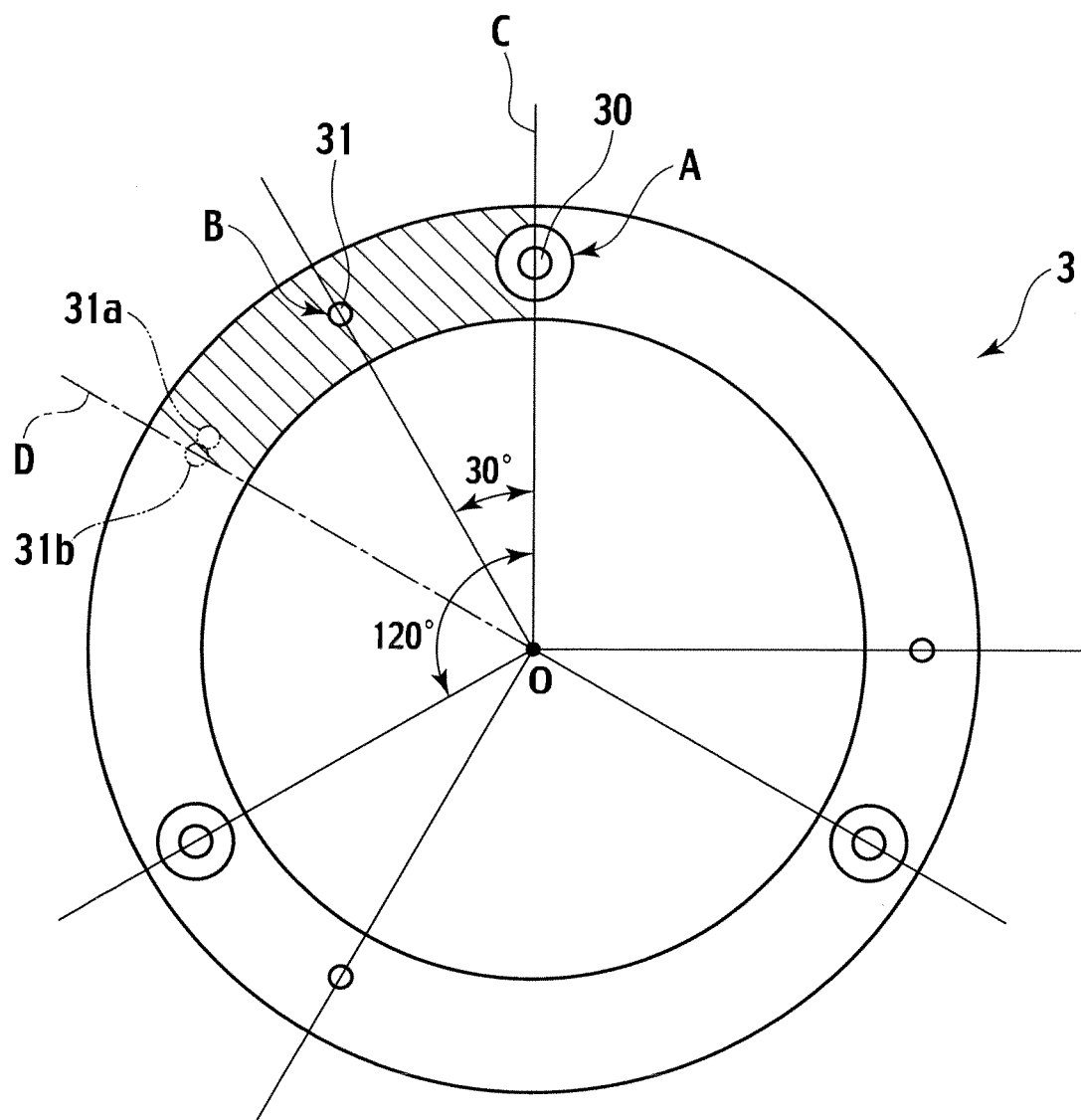
[FIG. 3]

The ring 3 is a thin plate member formed into a ring shape. Through-holes 30 are formed in the ring 3 as shown in FIG. 3 (a view of a front face of the ring 3 viewed from the front in a rotation axis direction of the motor 1). Motor housing bolts 40 for fixing the motor housing 4 to the ring 3 penetrate through the through-holes 30, respectively. Hereinafter, positions (through-holes 30) on the ring 3 at which the motor housing bolts 40 are fitted are each referred to as a motor-housing supporting point position A. In addition, through-holes 31 are formed in the ring 3. Transmission case bolts 20 for fixing the transmission case 2 onto the ring 3 penetrate through the through-holes 31, respectively. Hereinafter, positions (through-holes 31) on the ring 3 at which the transmission case bolts 20 are fitted are each referred to as a transmission-case supporting point position B. Note that the motor housing bolts 40 and the through-holes 30 correspond to a stator-side support member of the present invention, and the transmission case bolts and the through-holes 31 correspond to a motor-attachment-member-side support member of the present invention.

The multiple through-holes 30 are formed in the ring 3. Meanwhile, in a front view (FIG. 3) of the ring 3, half lines connecting a rotation axis O of the rotor 5 with the motor-housing supporting point positions A are each referred to as a motor-housing supporting line C, and a center line between each adjacent motor-housing supporting lines C (a bisector of an angle made between the adjacent motor-housing supporting lines C) is referred to as a motor-housing supporting center line D. The through-holes 31 are formed in angular regions each formed between one of the motor-housing supporting lines C and one of the motor-housing supporting center lines D which is adjacent to the motor-housing supporting lines C on one side in a circumferential direction (for example, counter-clockwise) of the ring 3. In Embodiment 1, the number of the through-holes 30 (motor-housing supporting point positions A) formed in the ring 3 is three. The through-holes are arranged every 120° at regular intervals in the circumferential direction of the ring 3 (the motor-housing supporting lines C are arranged every 120° at regular intervals). Meanwhile, the number of the through-holes 31 (transmission-case supporting point positions B) formed in the ring 3 is three. In FIG. 3, the through-holes 31 are arranged at positions which are shifted by 30° counter-clockwise relative to the motor-housing supporting lines C. Note that the motor-housing supporting lines C each correspond to a stator-side supporting line of the present invention and that the motor-housing supporting center lines D each correspond to a stator-side supporting center line of the present invention.

Meanwhile, "the through-hole 31 is formed in the angular region" means a state like a through-hole 31a illustrated in FIG. 3, in which the entirety of the through-hole 31a is located within the aforementioned angular region formed between the motor-housing supporting line C and the motor-housing supporting center line D. On the other hand, "the through-hole 31 is not formed in the angular region" means a state in which the entirety of a through-hole 31b is located outside the aforementioned angular region, and a state like the through-hole 31b illustrated in FIG. 3, in which part of the through-hole 31b is located within the aforementioned angular region (such a state that the motor-housing supporting center line D passes through the through-hole 31b).

[Vibration Occurring in Motor Housing]

Figure 4:
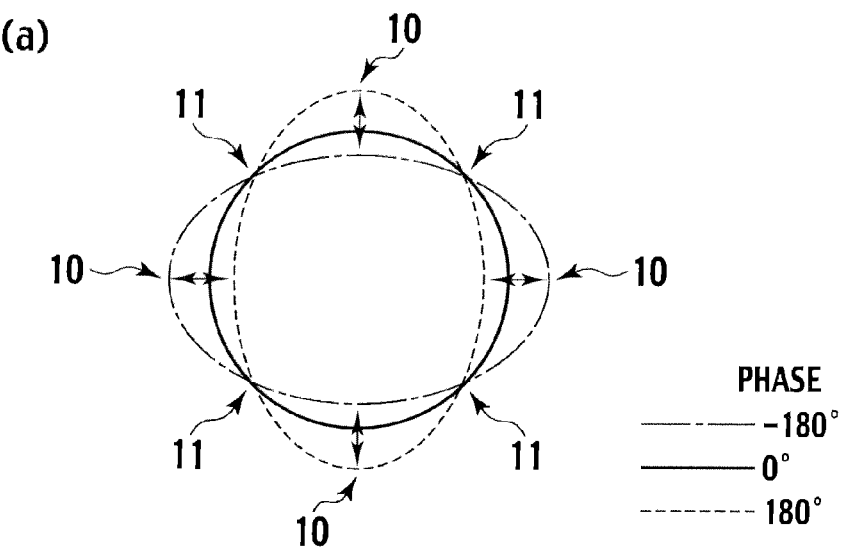
[FIG. 4]
Figure 4:
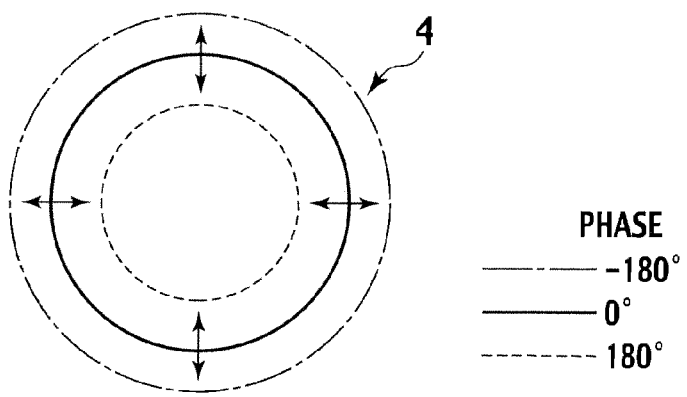
Figure 4:
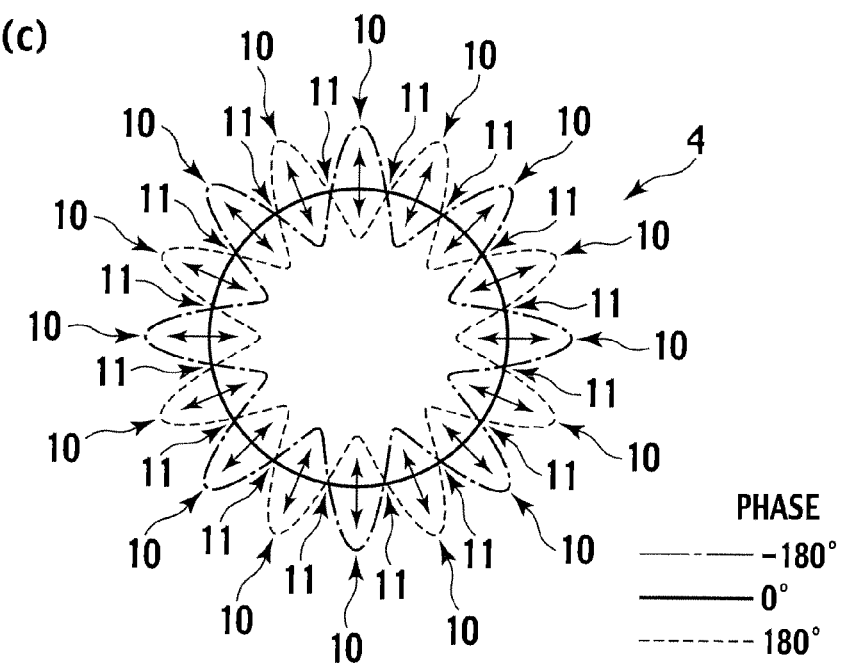

When the motor 1 is driven and the rotor 5 rotates, vibration occurs in the motor housing 4. FIG. 4 shows a diagram explaining typical vibration modes occurring in the motor housing 4. Parts (a) to (c) of FIG. 4 are diagrams schematically showing, by lines, the shapes of the motor housing 4 in a cross-section perpendicular to the rotation axis of the motor 1. A solid line, a thin dotted line and a thin chain line represent the shapes thereof in phases of 0°, 180° and −180°, respectively.

Part (a) of FIG. 4 shows a state of ring second-mode vibration. In the ring second-mode vibration, the numbers of anti-nodes 10 and nodes 11 occurring are twice as large as the mode number, that is, four anti-nodes 10 and four nodes 11 occur. The amplitude of the nodes 11 is zero. Accordingly, by connecting (fastening and fixing) portions of the motor housing 4 corresponding to the nodes 11 to the transmission case 2, it is possible to control the input of vibration displacements from the motor housing 4 to the transmission case 2 and to thereby suppress occurrence of vibration in the transmission case 2.

However, in ring zeroth-mode vibration and ring high-mode vibration which will be described later, vibration displacements are inputted from the motor housing 4 to the transmission case 2.

Part (b) of FIG. 4 shows a state of the ring zeroth-mode vibration. In the zeroth-mode vibration, no node 11 as in the ring second-mode vibration occurs, and thus it is not possible to connect a portion of the motor housing 4 corresponding to a node 11 to the transmission case 2. Accordingly, vibration displacements are inputted from the motor housing 4 to the transmission case 2, and thus occurrence of vibration in the transmission case 2 cannot be controlled.

Part (c) of FIG. 4 shows a state of ring eighth-mode vibration as an example of the ring high-mode vibration. In the eighth-mode vibration, the number of each of anti-nodes 10 and nodes 11 occurring is twice as large as the mode number, as in the ring second-mode vibration, that is, 16 anti-nodes 10 and 16 nodes 11 occur. The motor housing 4 is fastened and fixed to the transmission case 2 with bolts or the like. The bolts each have a predetermined cross sectional area for obtaining a strength large enough to support the motor housing 4. When the 16 anti-nodes 10 and 16 nodes 11 occur as in the ring eighth-mode vibration, the distance in a circumferential direction of the motor housing 4 between each of the anti-nodes 10 and the node 11 adjacent thereto is made short. For this reason, when the motor housing 4 is fastened and fixed to the transmission case 2 with bolts or the like, it is difficult to fasten and fix portions of the motor housing 4 corresponding to the nodes 11 to the transmission case 2, while avoiding portions of the motor housing 4 corresponding to the anti-nodes 10.

Hence, in Embodiment 1, the ring 3 is arranged between the motor housing 4 and the transmission case 2, and thereby vibration displacements from the motor housing 4 are firstly inputted to the ring 3. Then, vibration in a mode corresponding to the input positions of the vibration displacements is generated in the ring 3. In addition, the ring 3 is supported by the transmission case 2 at positions except positions where the amplitude of the thus generated vibration is the maximum.
[Relationship between Motor Housing Supporting Point and Mode of Vibration Occurring in Ring]

Next, descriptions are given of the motor-housing supporting point positions A, that is, positions at which vibration displacements of the motor housing 4 are inputted from the motor housing 4 to the ring 3, and of modes of vibration occurring in the ring 3 corresponding to these input positions.

Figure 5:
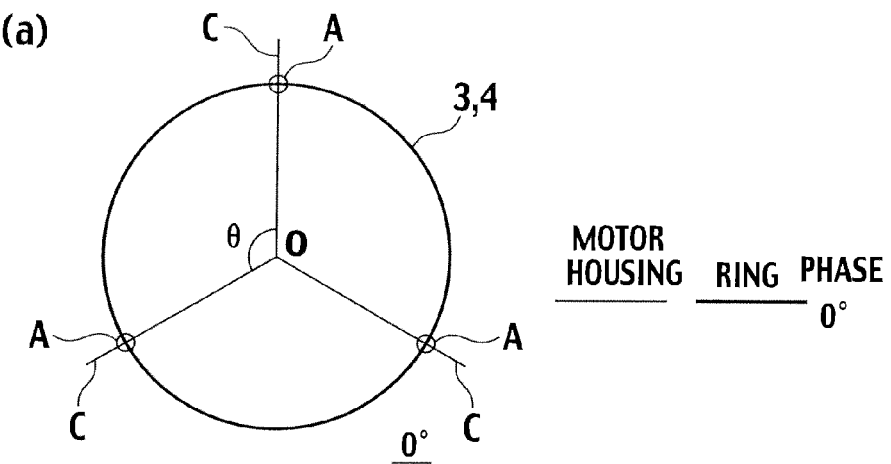
[FIG. 5]
Figure 5:
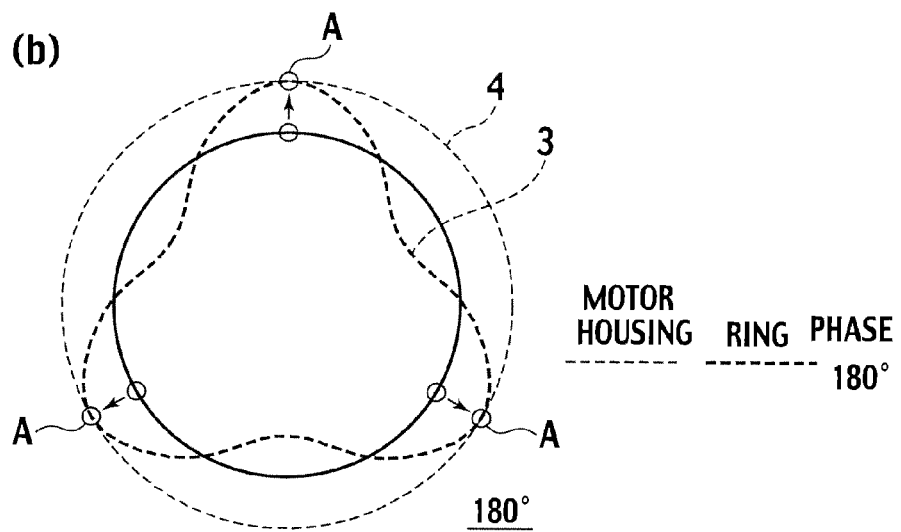
Figure 5:
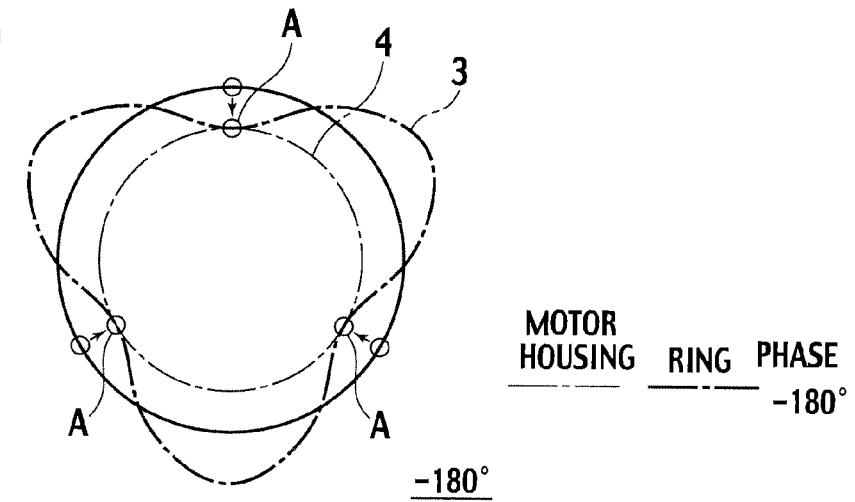

FIG. 5 is a diagram explaining the mode of vibration occurring in the ring 3 when the vibration displacements of the motor housing 4 vibrating in the ring zeroth-mode are inputted into the ring 3 through the motor-housing supporting point positions A. Parts (a) to (c) of FIG. 5 are diagrams schematically showing, by lines, the shapes of the motor housing 4 and the ring 3 in a cross-section perpendicular to the rotation axis of the motor 1. In parts (a) to (c) of FIG. 5, a thin solid line, a thin dotted line and a thin chain line represent the shapes of the motor housing 4 in phases of 0°, 180° and −160°, respectively, while a thick solid line, a thick dotted line and a thick chain line represent the shapes of the ring 3 in phases of 0° 180° and respectively. Incidentally, in each part of the figure, a circle representing the shape of the motor housing 4 and a circle representing the shape of the ring 3 which are in phase 0° overlap each other.

Here, a description is given of a case where the ring zeroth-mode vibration occurs in the motor housing 4. However, the mode of vibration occurring in the ring 3 is determined not by the mode of vibration occurring in the motor housing 4 but by the number of the motor-housing supporting point positions A. Accordingly, as long as the same number of motor-housing supporting point positions A as in this case are provided, the same effect can be obtained even in a case where any-numbered mode vibration other than the ring zeroth-mode vibration occurs in the motor housing 4.

The motor housing 4 is fixed to the ring 3 at the motor-housing supporting point positions A. The motor-housing supporting point positions A are arranged every angle θ in a front view of the ring 3 at three positions, as shown in Part (a) of FIG. 5. In this embodiment, the three motor-housing supporting point positions A are provided so that vibration inputted from the motor housing 4 can be converted into ring third-mode vibration in the ring 3. What is needed here is to arrange as many motor-housing supporting point positions A as the mode number of the vibration mode after the conversion.

When the phase of the ring zero-mode vibration occurring in the motor housing 4 is 180', the motor housing 4 is displaced in a direction of expanding in a radial direction as shown by the thin dotted line in Part (b) of FIG. 5. At this time point, displacements from the motor housing 4 outwardly in the radial direction are inputted to the ring 3 at the motor-housing supporting point positions A, thus resulting in such a shape of the ring 3 as shown by the thick dotted line in Part (b) of FIG. 5.

When the phase of the ring zero-mode vibration occurring in the motor housing 4 is −180°, the motor housing 4 is displaced in a direction of contracting in the radial direction as shown by the thin chain line in Part (c) of FIG. 5. At this time point, displacements from the motor housing 4 inwardly in the radial direction are inputted to the ring 3 at the motor-housing supporting point positions A, thus resulting in such a shape of the ring 3 as shown by the thick chain line in Part (c) of FIG. 5.

Figure 6:
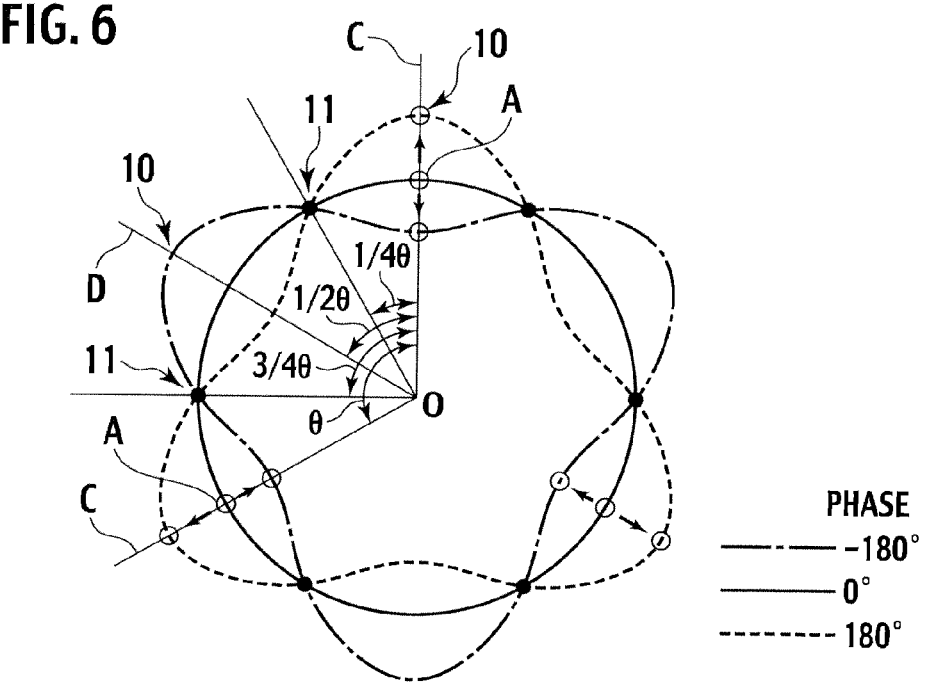
[FIG. 6]

FIG. 6 shows the shapes of the ring 3 shown in Parts (a) to (c) of FIG. 5 superimposed to each other. As shown in this figure, the ring third-mode vibration occurs in the ring 3.

Anti-nodes 10 of this vibration occur at a position on one of the motor-housing supporting lines C and positions (positions on the motor-housing supporting center lines D) shifted by (½)θ respectively clockwise and counterclockwise with respect to the motor-housing supporting line C. In contrast, nodes 11 of this vibration occur at: positions shifted by (¼)θ respectively clockwise and counterclockwise with respect to the motor-housing supporting line C; and positions shifted by (¾)θ respectively clockwise and counterclockwise with respect to the motor-housing supporting line C.

For this reason, when the ring 3 is fastened and fixed to the transmission case 2, the magnitude of the displacements inputted from the ring 3 to the transmission case 2 can be controlled by connecting the ring 3 and the transmission case 2 at positions except the anti-nodes 10 of the vibration of the ring 3. In particular, the connecting (fastening and fixing) of portions corresponding to the nodes 11 of the vibration of the ring 3 to the transmission case 2 can prevent the vibration displacements from being inputted from the ring 3 to the transmission case 2.

The positions except anti-nodes 10 of the vibration of the ring 3 each mean, in other words, a position within the angular region formed between one of the motor-housing supporting lines C and the motor-housing supporting center line D, a corresponding one of the anti-nodes 10 occurring on the motor-housing supporting line C, the motor-housing supporting center line D being the bisector of the angle made between the adjacent motor-housing supporting lines C. In contrast, positions of nodes 11 of the vibration of the ring 3 each mean, in other words, a position on the center line between the motor-housing supporting line C and the motor-housing supporting center line D (the bisector of the angle made between the motor-housing supporting line C and the motor-housing supporting center line D adjacent to the motor-housing supporting line C).

[Operations based on Configuration of Embodiment 1]

In Embodiment 1, each through-hole 30 (motor-housing supporting point position A) is arranged so that the angle between the adjacent motor-housing supporting lines C can be 120°. In addition, in the front view of the ring 3, each through-hole 31 (transmission-case supporting point position B) is arranged at the position shifted by 30° (one fourth of the angle 120° between the adjacent motor-housing supporting lines C) counter-clockwise with respect to the motor-housing supporting line C. Hereinbelow, functions based on this configuration will be described by using FIG. 7.

Figure 7:
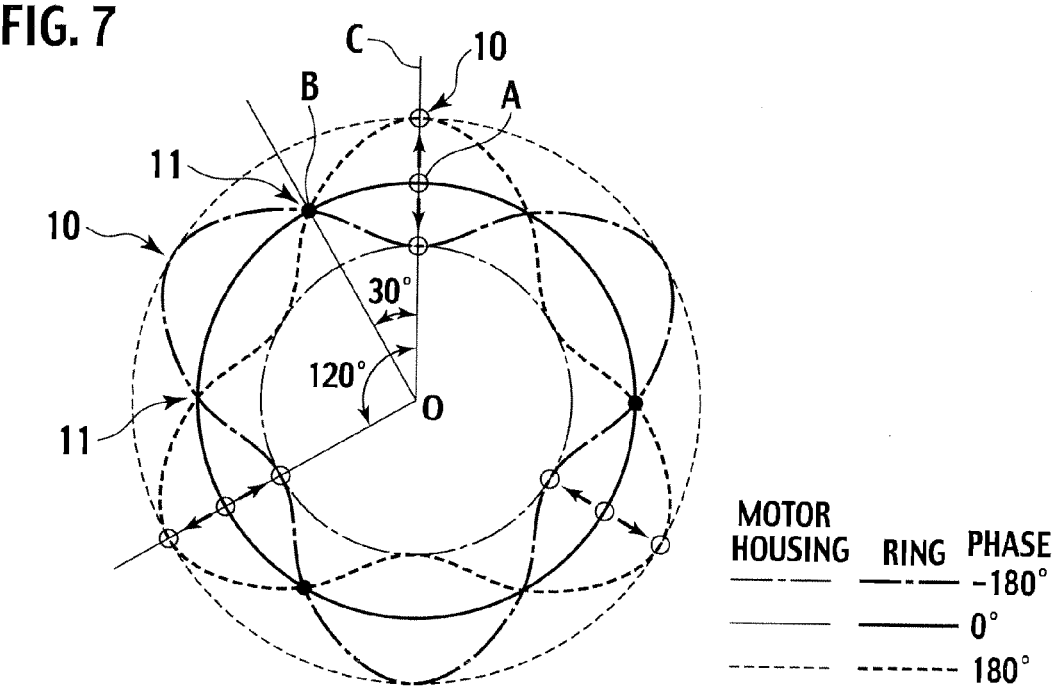
[FIG. 7]

FIG. 7 shows vibration occurring in the motor housing 4 and the ring 3 in Embodiment 1 in which the motor-housing supporting point positions A and the transmission-case supporting point positions B are arranged as described above.

Since the motor housing 4 is fixed to the ring 3 at the three motor-housing supporting point positions A, the ring third-mode vibration can be generated in the ring 3. In addition, the transmission case 2 is fixed to the ring 3 at the three transmission-case supporting point positions B, and each of the transmission-case supporting point positions B is arranged at the position shifted by 30° counter-clockwise with respect to the motor-housing supporting line C, in the front view of the ring 3. This position is the position shifted by one fourth of the angle of 120° between the adjacent motor-housing supporting lines C, and corresponds to the position of the node 11. Accordingly, it is possible to fix the transmission case 2 to the ring 3 at the positions of the nodes 11 of the ring 3. Consequently, transmission of vibration from the motor housing 4 to the transmission case 2 side can be controlled.

Next, a description is given of effects of Embodiment 1.

The motor according to Embodiment 1 of the present applied invention is the motor 1 including the stator 6 and the rotor 5 which are accommodated in the motor housing 4. The motor 1 includes: the ring 3 arranged between the transmission case 2 supporting the motor 1 and the motor housing 4; the multiple motor housing bolts 40 and the multiple through-holes 30 through which the motor housing bolts 40 are fitted, the multiple motor housing bolts 40 and the multiple through-holes 30 used to couple the motor housing 4 and the ring 3; and the multiple transmission case bolts 20 and the multiple through-holes 31 through which the transmission case bolts 20 are fitted, the multiple transmission case bolts 20 and the multiple through-holes 31 used to couple the ring 3 and the transmission case 2. In the front view of the ring 3, the half line connecting the rotation axis O of the rotor 5 with the center point of any one motor-housing supporting point position A among the multiple motor housing bolts 40 and the through-holes 30 (motor-housing supporting point positions A) is set as the motor-housing supporting line C, and the line evenly dividing the included angle made by the motor-housing supporting line C and another motor-housing supporting line C adjacent to the motor-housing supporting line C is set as the motor-housing supporting center line D. In this case, each transmission case bolt 20 and each through-hole 31 are arranged within the angular region, of the ring 3, formed between the motor-housing supporting center line D and the motor-housing supporting line C.

Thus, displacements of vibration having a smaller amplitude than that of the vibration occurring in the motor housing 4 are inputted to the transmission case 2 regardless of the mode of vibration occurring in the motor housing 4. Accordingly, vibration occurring in the transmission case 2 can be controlled.

In addition, in the motor according to Embodiment 1 of the present applied invention, the transmission case bolts 20 and the through-holes 31 (transmission-case supporting point positions B) are each arranged in a central part of the angular region of the ring 3 formed between the motor-housing supporting center line D and the motor-housing supporting line C (in the angular region, near the bisector of the angle made between the motor-housing supporting center line D and the motor-housing supporting line C).

Accordingly, the transmission case bolt 20 is arranged at the position of the node 11 of the vibration in the ring 3, and thus the displacement of the vibration in the ring 3 is not inputted into the transmission case 2. This can prevent vibration occurring in the transmission case 2.

<Embodiment 2>

In Embodiment 1, the motor housing 4 is fixed to the ring 3 with the motor housing bolts 40, and the transmission case 2 is fixed to the ring 3 with the transmission case bolts 20. In contrast, Embodiment 2 is different from Embodiment 1 in that the motor housing 4 is engaged with the ring 3 with motor housing pins 41, and the ring 3 is engaged with the transmission case 2 with transmission case pins 34.

Figure 8:
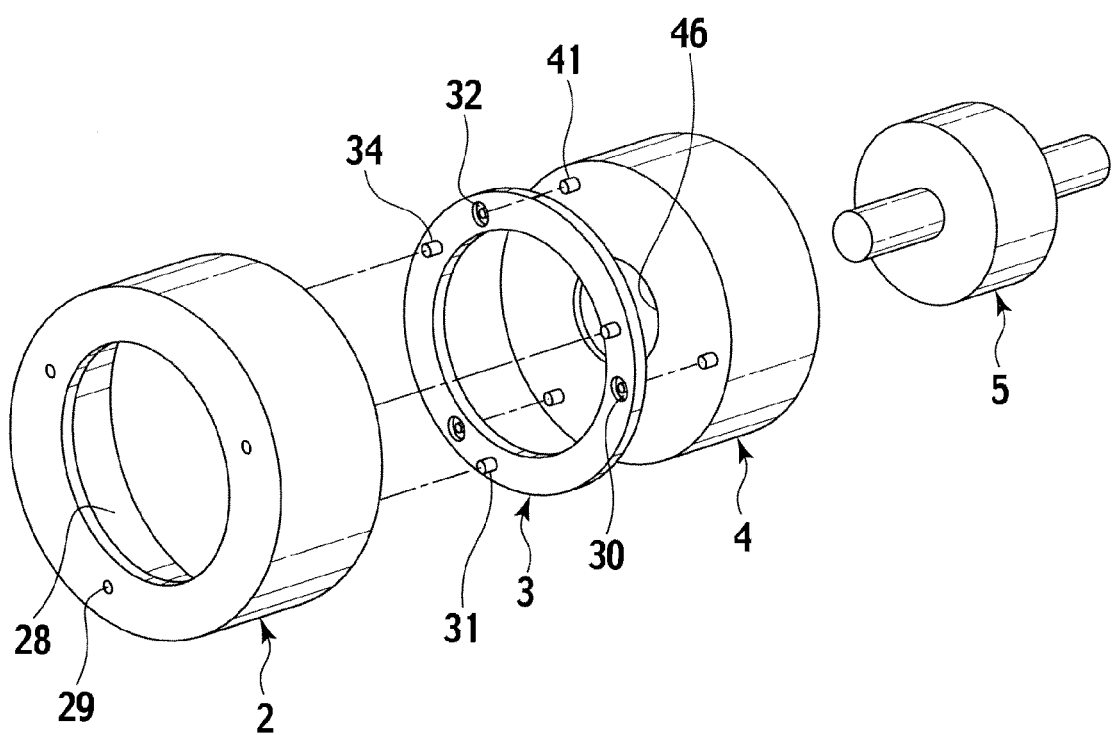
[FIG. 8]

FIG. 8 is an exploded perspective view showing a configuration of a motor 1 according to Embodiment 2 of the present invention. Components in the same configuration as in Embodiment 1 are denoted by the same reference numerals and the description thereof is omitted.

The multiple motor housing pins 41 are formed on the bottom wall portion of the motor housing 4, protruding frontward from a front side-surface of the bottom wall portion. The motor housing pins 41 are arranged at positions corresponding to the motor-housing supporting point positions A of the ring 3, on the front side-surface of the bottom wall portion. The motor housing pins 41 are rotatably engaged with through-holes 32 formed at the motor-housing supporting point positions A of the ring 3, respectively. In addition, the multiple transmission case pins 34 are formed on the ring 3, protruding frontward from a front side-surface of the ring 3. The transmission case pins 34 are arranged at the transmission-case supporting point positions B, on the front side-surface of the ring 3. The transmission case pins 34 are rotatably engaged with through-holes 29 of the transmission case 2, the through-holes 29 being formed at positions corresponding to the transmission-case supporting point positions B of the ring 3. Note that the through-holes 29 and the transmission case pins 34 each correspond to the motor-attachment-member-side support member of the present invention.

[Rotary Displacement at Nodes of Vibration]

Figure 9:
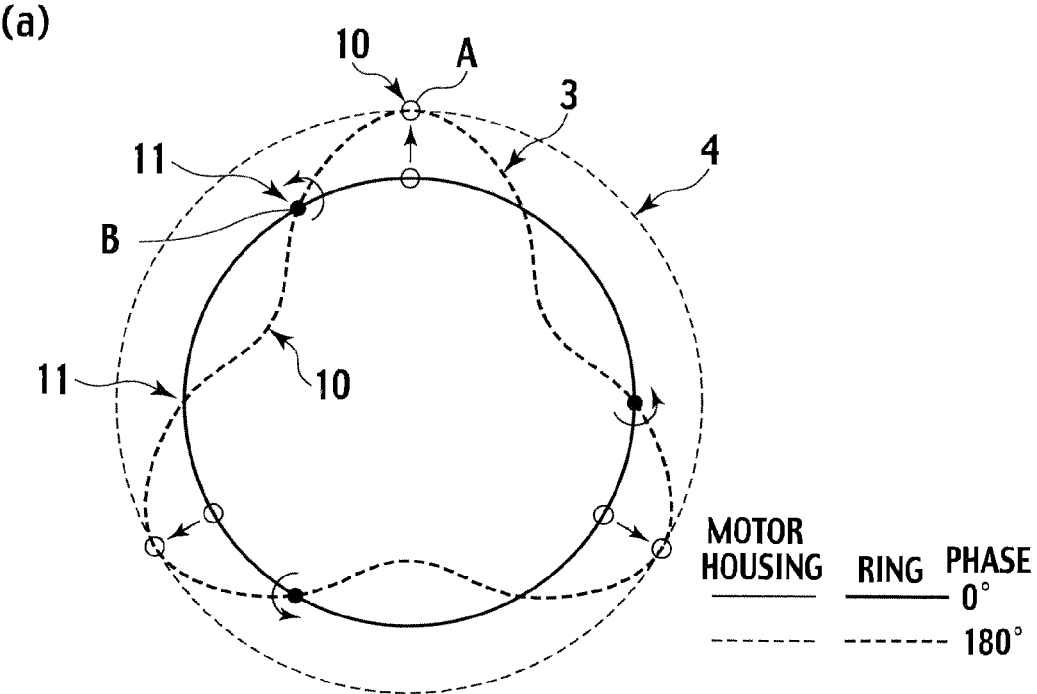
FIG. 9 is a diagram explaining vibration occurring in a ring in Embodiment 2.
Figure 9:
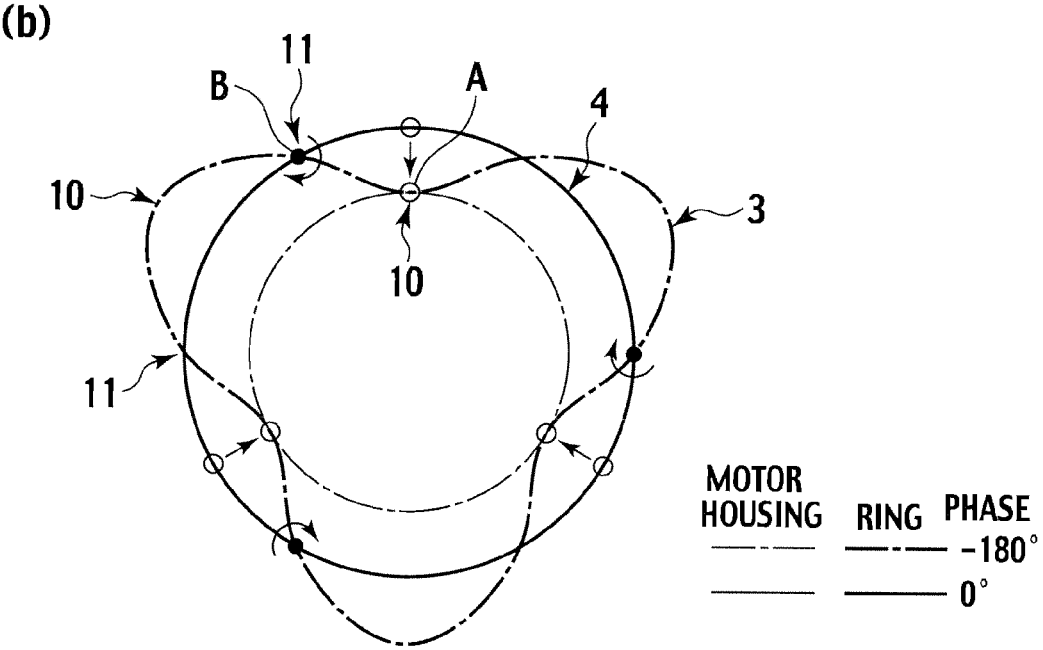

Rotary displacements as shown by the arrows in FIG. 9 occur at nodes 11 of vibration occurring in the ring 3. Hereinafter, a description is given of the rotary displacements occurring at the nodes 11 by using FIG. 9.

FIG. 9 is a diagram explaining the vibration occurring in the ring 3 due to displacements inputted from the motor housing 4 to the ring 3. Parts (a) and (b) of FIG. 9 are diagrams schematically showing, by lines, the shapes of the motor housing 4 and the ring 3 in the cross-section perpendicular to the rotation axis of the motor 1. In Parts (a) and (b) of FIG. 9, a thin solid line, a thin dotted line and a thin chain line represent the shapes of the motor housing 4 in phases of 0°, 180° and −180°, respectively, while a thick solid line, a thick dotted line and a thick chain line represent the shapes of the ring 3 in phases of 0°, 180° and −180°, respectively. Incidentally, in each part of the figure, a circle representing the shape of the motor housing 4 and a circle representing the shape of the ring 3 which are in phase 0° overlap each other.

As shown in FIG. 9, portions of the ring 3 which correspond to the nodes 11 are not displaced in the radial direction (radial positions of the nodes 11 are not changed), even though the phase of the vibration changes. However, each of the portions corresponding to the nodes 11 is displaced in a rotational direction around a corresponding one of the transmission-case supporting point positions B (rotatably displaced around an axis which is parallel to the rotation axis of the motor 1 and which passes through the center of the transmission-case supporting point position B). If the rotary displacement is inputted into the transmission case 2 through the portions corresponding to the nodes 11, vibration occurs in the transmission case 2.

Hence, in Embodiment 2, the transmission case pins 34 are rotatably coupled into the through-holes 29 formed in the transmission case 2, respectively. Specifically, each of the transmission case pins 34 extends frontward from the front side-surface of the ring 3 substantially parallel to the rotation axis of the motor 1, and is inserted into a corresponding one of the through-holes 29. The transmission case pin 34 is supported rotatably around an axis of the transmission case pin 34 (or around the axis of the through-hole 29) relative to the through-hole 29

This reduces the input of the rotary displacement of the portion corresponding to the node 11 of the ring 3 to the transmission case 2 from the ring 3. For this reason, occurrence of vibration in the transmission case 2 can be suppressed.

<Embodiment 3>

In Embodiment 1 and Embodiment 2 which are described above, the ring 3 is arranged between the transmission case 2 and the motor housing 4. In contrast, Embodiment 3 is different from Embodiment 1 and Embodiment 2 in that the ring 3 is accommodated on the inner circumferential side of the motor housing 4.

Figure 10:
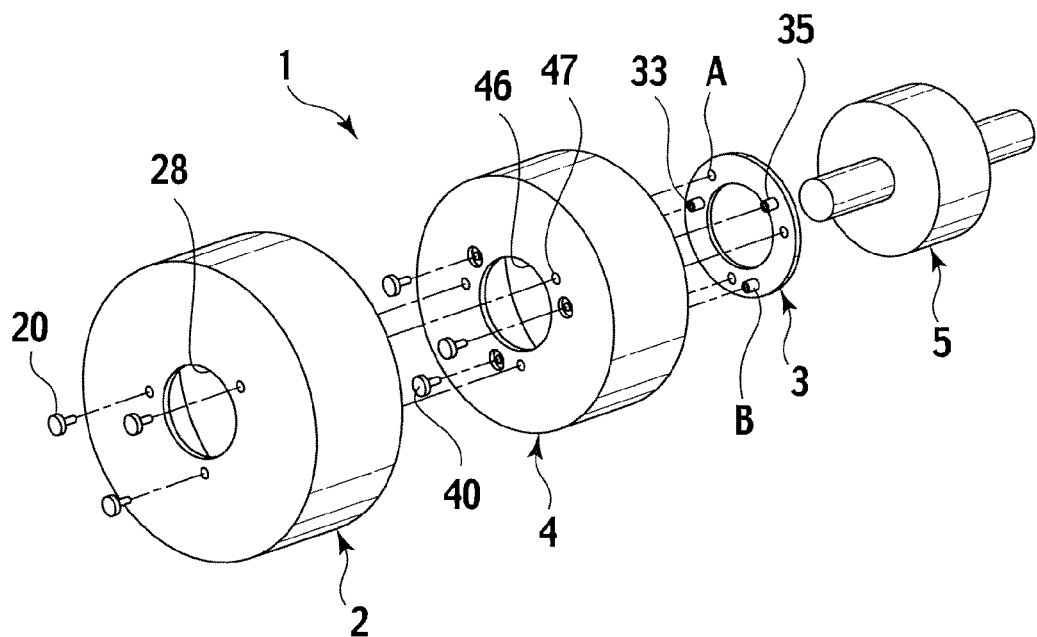
[FIG. 10]
Figure 11:
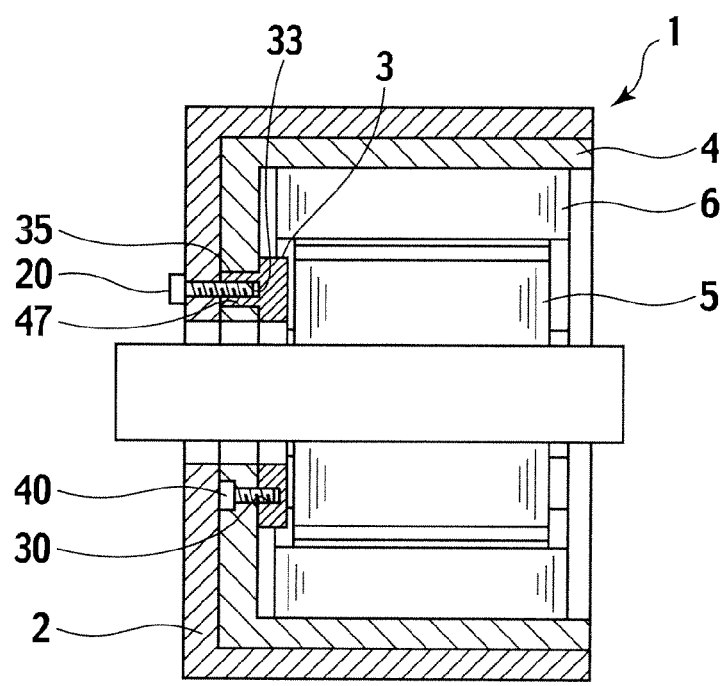
[FIG. 11]

FIG. 10 is an exploded perspective view showing a configuration of a motor 1 according to Embodiment 3 of the present invention. FIG. 11 is a cross-sectional view shown by a plane including a rotation axis of the motor 1.

Components in the same configuration as in Embodiment 1 are denoted by the same reference numerals and the description thereof is omitted.

The ring 3 is inserted into the motor housing 4 on the inner circumferential side of the stator 6 fixed on the motor housing 4. Specifically, the ring 3 is attached to an inner side-surface (rear side-surface) of the bottom wall portion of the motor housing 4, the inner side-surface being inward of the inner surface of the stator 6 in the radial direction. Multiple protrusions 35 are formed on the ring 3 at the transmission-case supporting point positions B. Through-holes 47 through which the protrusions 35 penetrate are formed in the bottom wall portion of the motor housing 4 at positions corresponding to the protrusions 35. Engaging holes 33 with which the transmission case bolts 20 engage are formed in front end surfaces of the protrusions 35, respectively. The ring 3 is fixed to the transmission case 2 by engaging the transmission case bolts 20 with the engaging holes 33.

When the rotor 5 is mounted in the stator 6, end portions, in an axial direction, of the inner circumferential surface of the stator 6 do not face an outer surface of the rotor 5, as shown in FIG. 11. The motor 1 in Embodiment 3 enables the ring 3 to be arranged in a portion where the outer surface of the rotor 5 does not face the end portions of the stator 6, that is, in a gap formed inward of the inner circumferential surface of the stator 6 in the radial direction and between the bottom wall portion of the motor housing 4 and the rotor 5. Accordingly, the length of the motor 1 in an axial direction can be reduced.

<Other Embodiments>

As described above, the best modes for carrying out the present invention have been described based on Embodiment 1 to Embodiment 3. The concrete configuration of the present invention, however, is not limited to Embodiment 1 to Embodiment 3, and the present invention includes other configurations which include a design modification or the like made without departing from the gist of the invention. Hereinbelow, descriptions are given of Another Embodiments 1 to 6. Components in the same configuration as in Embodiment 1 to Embodiment 3 are denoted by the same reference numerals, and the description thereof is omitted.

<Another Embodiment 1>

Figure 12:
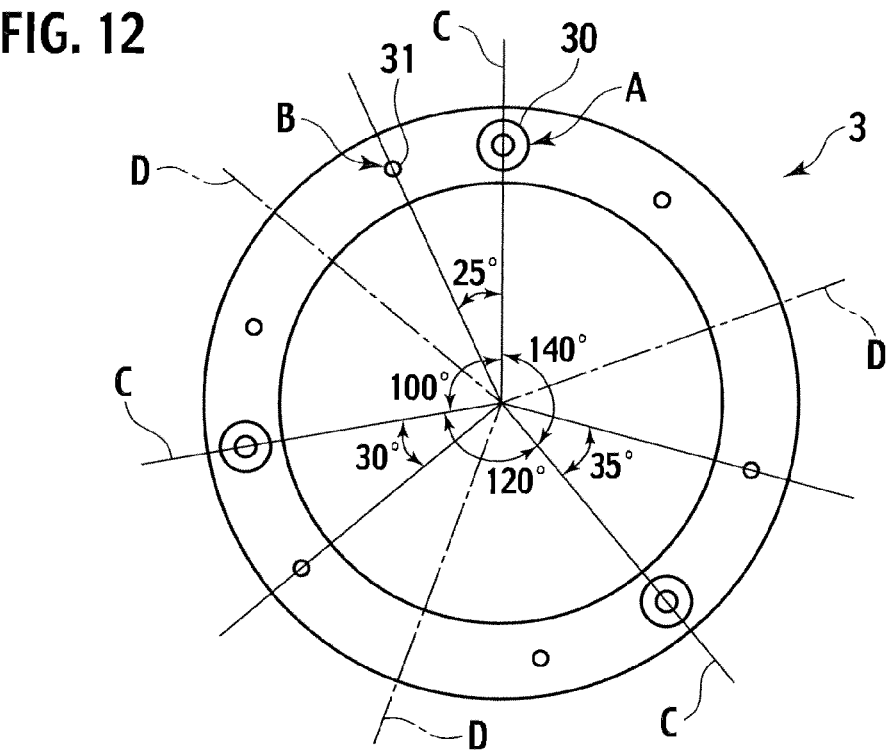
[FIG. 12]

FIG. 12 is a front view of a ring 3 according to Another Embodiment 1.

In Embodiment 1, motor-housing supporting point positions A are arranged at regular intervals in the circumferential direction of the ring 3. However, as shown in FIG. 12, the motor-housing supporting point positions A may be arranged at irregular intervals. In the ring 3 of Another Embodiment 1, the intervals of motor-housing supporting point positions A in the circumferential direction are respectively set to be 100°, 120° and 140° in the counter-clockwise order in the front view of the ring 3 (FIG. 12). Note that transmission-case supporting point positions B are arranged at positions which are respectively shifted by 25° (=100°×(¼)), 30°(=120°×(¼)) and 35°(=140°×(¼)) counter-clockwise with respect to the corresponding motor-housing supporting lines C.

To put it differently, in the ring 3 in Another Embodiment 1, each of the transmission-case supporting point positions B is provided on the center line between one of motor-housing supporting lines C and a motor-housing supporting center line D (on a bisector of an angle made between the motor-housing supporting line C and the motor-housing supporting center line D adjacent to the motor-housing supporting line C counter-clockwise in the front view of the ring 3).

Accordingly, the transmission-case supporting point position B is arranged at a node 11 of vibration occurring in the ring 3, and thus a displacement is not inputted to the transmission case 2. Consequently, occurrence of vibration in the transmission case 2 can be prevented.

<Another Embodiment 2>

Figure 13:
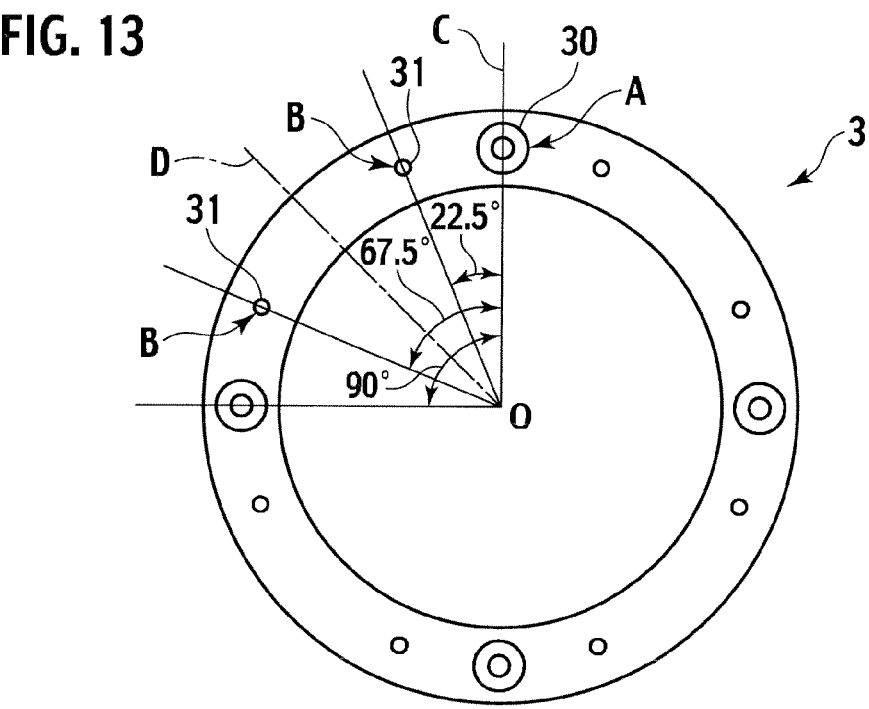
[FIG. 13]

FIG. 13 is a front view of a ring 3 according to Another Embodiment 2.

In Embodiment 1, the three motor-housing supporting point positions A and the three transmission-case supporting point positions B are formed. However, four motor-housing supporting point positions A and eight transmission-case supporting point positions B may be formed, as shown in FIG. 13. Specifically, as long as two or more motor-housing supporting point positions A are arranged and a distance between an anti-node 10 and a node 11 of vibration occurring in the ring 3 is large enough relative to the diameter of the transmission case bolt 20, any number of motor-housing supporting point positions A may be provided. In contrast, as long as two or more transmission-case supporting point positions B are arranged in portions corresponding to portions not including the anti-nodes 10 of the vibration occurring in the ring 3 or arranged in portions corresponding to the nodes 11, any number of transmission-case supporting point positions B may be provided.

In the ring 3 in Another Embodiment 2, the motor-housing supporting point positions A are arranged every 90° at regular intervals in the circumferential direction of the ring 3. Note that, in the front view of the ring 3, transmission-case supporting point positions B are arranged at positions shifted by 22.5°(=90°×(¼)) respectively clockwise and counter-clockwise with respect to one of motor-housing supporting lines C and at positions shifted by 67.5°(=90°×(¾)) respectively clockwise and counter-clockwise with respect to the motor-housing supporting line C.

To put it differently, in the ring 3 in Another Embodiment 2, each of the transmission-case supporting point positions B is provided on the center line between the motor-housing supporting line C and a motor-housing supporting center line D (on a bisector of an angle made between the motor-housing supporting line C and the motor-housing supporting center line D adjacent to the motor-housing supporting line C counter-clockwise in the front view of the ring 3, and on a bisector of an angle made between the motor-housing supporting line C and the motor-housing supporting center line D adjacent to the motor-housing supporting line C clockwise the front view of the ring 3).

Accordingly, the transmission-case supporting point position B is arranged at the node 11 of vibration occurring in the ring 3, and thus a displacement is not inputted to the transmission case 2. Consequently, occurrence of vibration in the transmission case 2 can be prevented.

<Another Embodiment 3>

Figure 14:
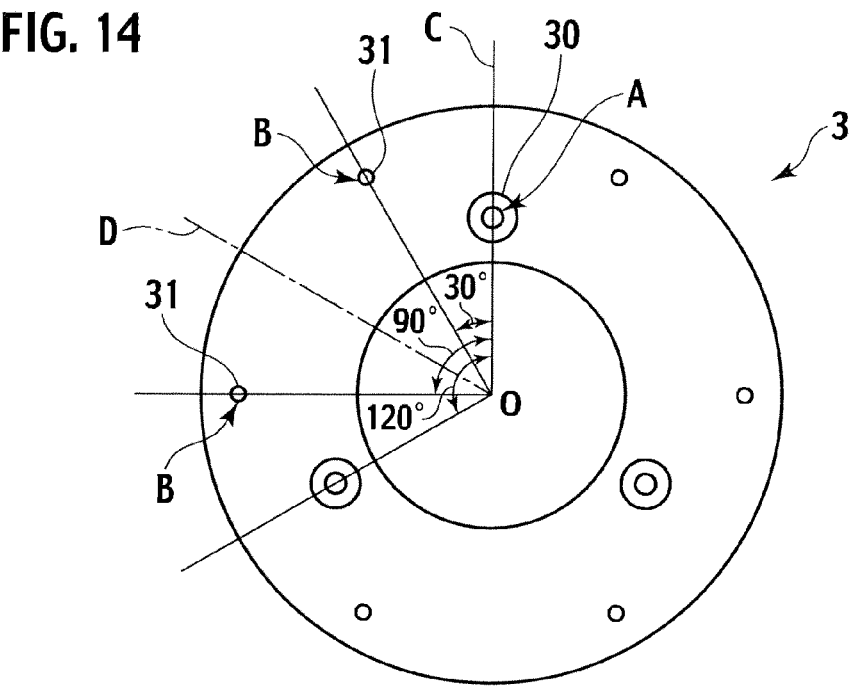
[FIG. 14]

FIG. 14 is a front view of a ring 3 according to Another Embodiment 3.

In Embodiment 1, each of the motor-housing supporting point positions A and each of the transmission-case supporting point positions B are formed on a concentric circle. However, positions of the motor-housing supporting point position A and the transmission-case supporting point position B in the radial direction may be different as shown in FIG. 14.

In the ring 3 in Another Embodiment 3, motor-housing supporting point positions A are arranged every 120° at regular intervals in the circumferential direction of the ring 3. Note that, in the front view of the ring 3, transmission-case supporting point positions B are arranged at positions shifted by 30°(=120°×(¼)) respectively clockwise and counter-clockwise with respect to one of motor-housing supporting lines C and at positions shifted by 90°(=120°×(¾)) respectively clockwise and counter-clockwise with respect to the motor-housing supporting line C.

In addition, the transmission-case supporting point positions B are arranged outward of the motor-housing supporting point positions A in the radial direction.

To put it differently, in the ring 3 in Another Embodiment 3, each of the transmission-case supporting point positions B is provided on the center line between the motor-housing supporting line C and a motor-housing supporting center line D (on a bisector of an angle made between the motor-housing supporting line C and the motor-housing supporting center line D adjacent to the motor-housing supporting line C counter-clockwise in the front view of the ring 3, and on a bisector of an angle made between the motor-housing supporting line C and the motor-housing supporting center line D adjacent to the motor-housing supporting line C clockwise in the front view of the ring 3).

Accordingly, the transmission-case supporting point position B is arranged at a node 11 of vibration occurring in the ring 3, and thus a displacement is not inputted to the transmission case 2. Consequently, occurrence of vibration in the transmission case 2 can be prevented.

<Another Embodiment 4>

Figure 15:
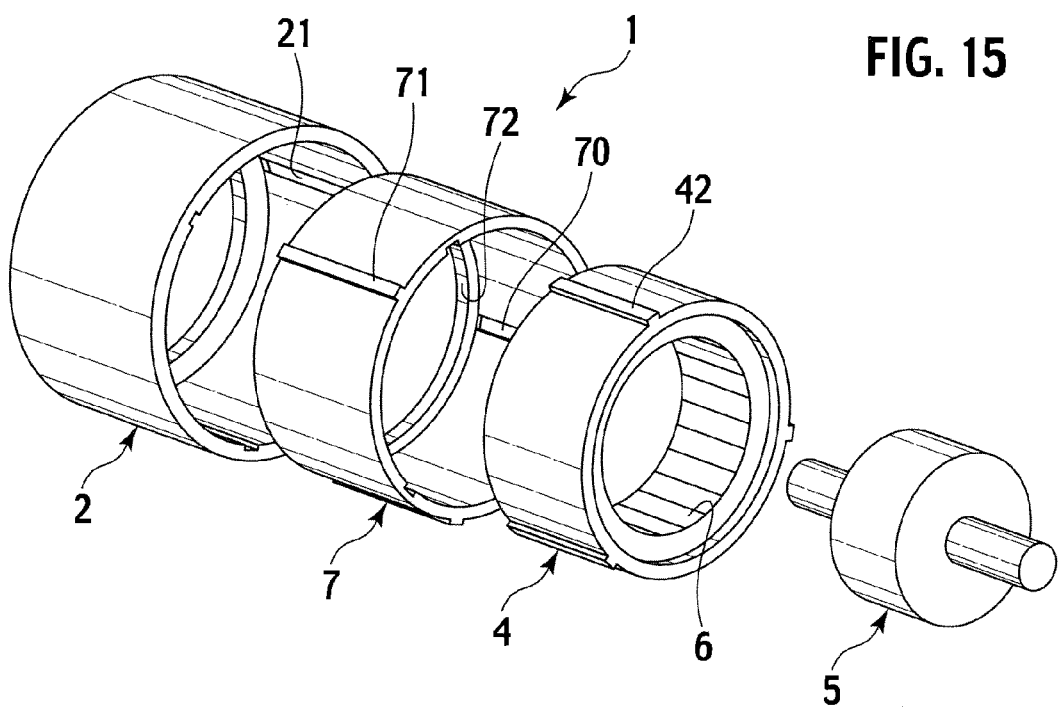
[FIG. 15]

FIG. 15 is a perspective view of a motor 1 according to Another Embodiment 4.

In Embodiment 1, the ring 3 is fixed to the transmission case 2 with the transmission case bolts 20, and the motor housing 4 is fixed to the ring 3 with the motor housing bolts 40. However, as shown in FIG. 15, an intermediate member 7 may be provided instead of the ring 3. The intermediate member 7 may be fixed to the transmission case 2 with keys, and the motor housing 4 may be fixed to the intermediate member 7 with keys.

The intermediate member 7 is formed into a shape of a closed-bottom cylindrical cup having a bottom wall portion on the front side thereof. A through-hole 72 into which the shaft of the rotor 5 is inserted is provided in the bottom wall portion of the intermediate member 7. Multiple key grooves 70 parallel to the axial direction of the intermediate member 7 are formed in an inner circumferential surface of the intermediate member 7, extending all over the length of the intermediate member 7. Multiple keys 71 parallel to the axial direction of the intermediate member 7 are formed on an outer circumferential surface of the intermediate member 7, extending all over the length of the intermediate member 7. Each of the key grooves 70 is formed at the same position in the circumferential direction as the motor-housing supporting point position A in Embodiment 1, that is, formed on a corresponding motor-housing supporting line C. In addition, each of the keys 71 is formed at the same position in the circumferential direction as the transmission-case supporting point position B in Embodiment 1, that is, within angular regions each formed between the motor-housing supporting line C and the motor-housing supporting center line D adjacent to the motor-housing supporting line C on one side in the circumferential direction (for example, counter-clockwise).

Keys 42 are formed on the outer circumferential surface of the motor housing 4 at positions corresponding to the key grooves 70 of the intermediate member 7. Key grooves 21 are formed in the inner circumferential surface of the transmission case 2 at positions corresponding to the keys 71 of the intermediate member 7.

The intermediate member 7 is inserted into the transmission case 2, and the key grooves 21 and the keys 71 engage with each other. In addition, the motor housing 4 is inserted into the intermediate member 7, and the key grooves 70 and the keys 42 engage with each other.

Specifically, in the intermediate member 7, the keys 42 of the motor housing 4 and the key grooves 70 of the intermediate member 7 are joined to each other at motor-housing supporting point positions A, while the keys 71 of the intermediate member 7 and the key grooves 21 of the transmission case 2 are joined to each other at transmission-case supporting point positions B. Hence, also in the motor 1 according to Another Embodiment 4, each of the transmission-case supporting point positions B is provided on the center line between the motor-housing supporting line C and the motor-housing supporting center line D.

Accordingly, the transmission-case supporting point position B is arranged at a node 11 of vibration occurring in the ring 3, and thus a displacement is not inputted to the transmission case 2. Consequently, occurrence of vibration in the transmission case 2 can be prevented.

<Another Embodiment 5>

Figure 16:
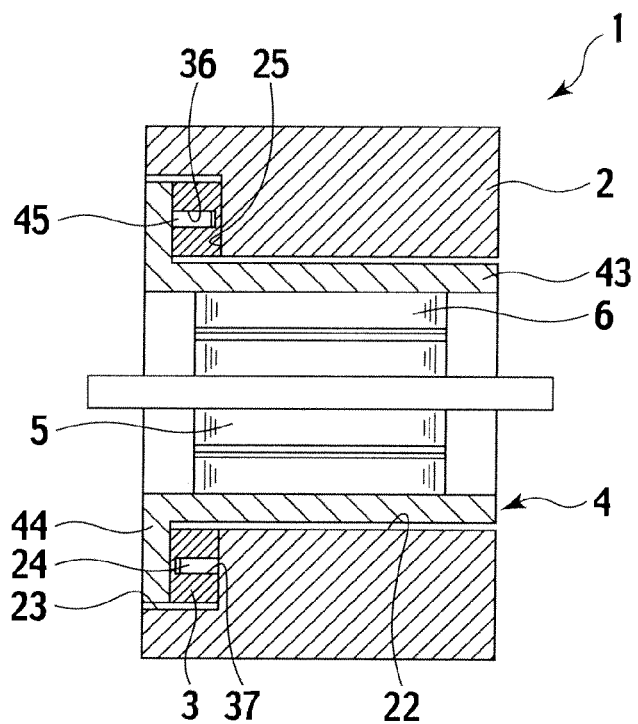
[FIG. 16]

FIG. 16 is a cross-sectional view of a motor 1 according to Another Embodiment 5.

In Embodiment 1, the motor housing 4 is formed into the closed-bottom cylindrical cup shape, the through-hole 46 is provided in the bottom wall portion thereof, and the stator 6 is fixed onto the inner circumferential surface of the motor housing 4. However, as shown in FIG. 16, the motor housing 4 may be shaped to have a cylindrical portion 43 and a flange 44 provided along one end of a side surface of the cylindrical portion 43.

A transmission case 2 according to Another Embodiment 5 has a substantially cylindrical shape. The transmission case 2 is formed of a small-diameter portion 22, a large-diameter portion 23 and a step portion 25. The cylindrical portion 43 the motor housing 4 is inserted into the small-diameter portion 22. The large-diameter portion 23 is provided on the one end side of the transmission case 2 and the flange 44 of the motor housing 4 is inserted into the large-diameter portion 23. The step portion 25 connects the large-diameter portion 23 and the small-diameter portion 22. The small-diameter portion 22 has an inner diameter larger than an outer diameter of the cylindrical portion 43 of the motor housing 4. The large-diameter portion 23 has an inner diameter larger than an outer diameter of the flange 44 of the motor housing 4.

An outer diameter of the ring 3 is smaller than the inner diameter of the large-diameter portion 23 of the transmission case 2. In addition, an inner diameter of the ring 3 is larger than the outer diameter of the cylindrical portion 43 of the motor housing 4. The cylindrical portion 43 of the motor housing 4 is inserted into the ring 3. The ring 3 is accommodated in a gap formed: between an inner circumferential surface of the large-diameter portion 23 of the transmission case 2 and an outer circumferential surface of the cylindrical portion 43 of the motor housing 4; and between the flange 44 of the motor housing 4 and the step portion 25 of the transmission case 2.

Multiple protrusions 45 protruding backward in the axial direction from a rear side-surface of the flange 44 are formed on the flange 44 of the motor housing 4. The protrusions 45 are provided at positions on the rear side-surface of the flange 44 which correspond to through-holes 36 formed at motor-housing supporting point positions A of the ring 3. The protrusions 45 and the through-holes 36 are rotatably engaged with each other.

Multiple protrusions 24 protruding frontward in the axial direction from a surface of the step portion 25 are formed on the step portion 25 of the transmission case 2. The protrusions 24 are provided at positions on the surface of the step portion which correspond to through-holes 37 formed at transmission-case supporting point positions B of the ring 3. The protrusions 24 and the through-holes 37 are rotatably engaged with each other.

According to a configuration of Another Embodiment 5, since the transmission case 2, the ring 3 and the motor housing 4 do not overlap the rotor 5 and the stator 6 in the axial direction (projections of the transmission case 2, the ring 3 and the motor housing 4 in the axial direction do not overlap projections of the rotor 5 and the stator 6 in the axial direction), the length of the motor 1 in the axial direction can be reduced.

<Another Embodiment 6>

Figure 17:
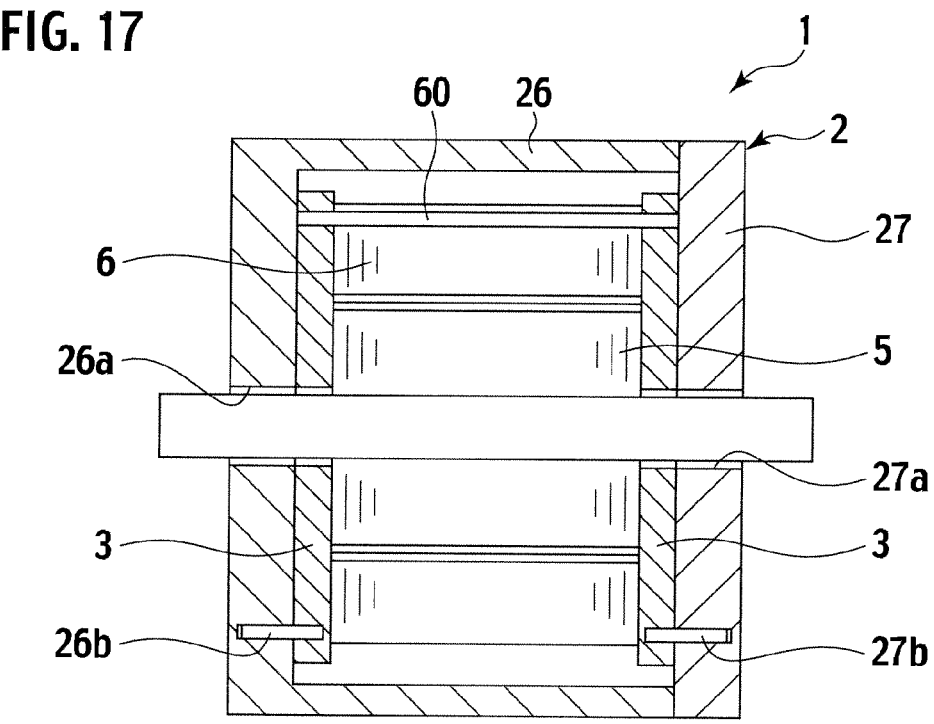
[FIG. 17]

FIG. 17 is a cross-sectional view of a motor 1 according to Another Embodiment 6.

In Embodiment 1, the stator 6 is fixed to the motor housing 4, and the motor housing 4 and the stator 6 are fixed to the ring 3. However, the stator 6 may be fixed to the ring 3 directly.

As shown in FIG. 17, the transmission case 2 is formed of a cup portion 26 formed into a closed-bottom cylindrical cup shape, a lid portion 27 which closes an opening side of this cup portion 26. A through-hole 26a into which a one end side of the shaft of the rotor 5 is inserted is provided in a bottom wall portion of the cup portion 26. A through-hole 27a into which the other end side of the shaft of the rotor 5 is inserted is provided in the lid portion 27.

Two rings 3 are inserted into the cup portion 26 of the transmission case 2. One of the two rings 3 is joined to a bottom surface of the cup portion 26 with a transmission case pin 26b, while the other ring 3 is joined to an inner side-surface of the lid portion 27 with a transmission case pin 27b.

In addition, the stator 6 is sandwiched between the above two rings 3, and joined to both the rings 3 with a stator pin 60 penetrating the stator 6 in the axial direction thereof.

According to a configuration of Another Embodiment 6, since the stator 6 can be fixed to the rings 3 without providing the motor housing 4, reduction in the number of parts as well as reduction in size of the motor 1 can be achieved.

Embodiment 1 to 3, and Another Embodiment 1 to 6 which have been described above are only exemplars described for easier understanding of the present invention, and the present invention is not limited to the embodiments. Components disclosed in the above embodiments, an appropriately made combination of the above embodiments, and a change or a modification which pertains to the technical scope of the present invention are all within the scope of the present invention.

This application claims priority from Japanese Patent Application Number 2008-061486 filed on Mar. 11, 2008, the content of which is incorporated herein by reference in its entirety.

INDUSTRIAL APPLICABILITY

The motor of the present invention sets: stator-side supporting lines each connecting a rotation axis of a rotor-side member with one of the stator-side support members which support the stator-side member; and center lines each evenly dividing an included angle made by one of the stator-side supporting lines and another stator-side supporting line adjacent to the one stator-side supporting line. Motor-attachment-member-side support members are arranged in an intermediate member within angular-regions each formed between the center line and the stator-side supporting line. Thereby, a motor attachment member receives a displacement of vibration whose magnitude is smaller than that of vibration occurring in the stator-side member, regardless of the mode of vibration occurring in the stator-side member. Thus, vibration occurring in the motor attachment member can be controlled. Therefore, the motor, the motor support member and the motor support method of the present invention are industrially applicable.

The invention claimed is:

1. A motor including a stator-side member and a rotor-side member, comprising:
    an intermediate member arranged between a motor attachment member which supports the motor, and the stator-side member;
    a plurality of stator-side support members for coupling the stator-side member and the intermediate member; and
    a plurality of motor-attachment-member-side support members for coupling the intermediate member and the motor attachment member,
    wherein, when a stator-side supporting line is defined as a line connecting a center of one of the plurality of stator-side support members with a rotation center of the rotor-side member, and when a center line is defined as a line evenly dividing an included angle made by the stator-side supporting line and another stator-side supporting line adjacent to the stator-side supporting line, each of the motor-attachment-member-side support members is arranged in the intermediate member within an angular region formed between the center line and the stator-side supporting line.

2. The motor according to claim 1, wherein each of the motor-attachment-member-side support members is arranged in a central portion of the angular region.

3. The motor according to claim 1, wherein the motor-attachment-member-side support members are rotatably attached to the intermediate member.

4. An intermediate member provided between a motor and a motor attachment member to which the motor is attached, the motor including a stator-side member and a rotor-side member, the intermediate member comprising:
    a plurality of stator-side support members to be coupled to the stator-side member; and
    a plurality of motor-attachment-member-side support members to be coupled to the motor attachment member,
    wherein, when a stator-side supporting line is defined as a line connecting a center of one of the plurality of stator-side support members with a rotation center of the rotor-side member, and when a center line is defined as a line evenly dividing an included angle made by the stator-side supporting line and another stator-side supporting line adjacent to the stator-side supporting line, each of the motor-attachment-member-side support members is arranged within an angular region formed between the center line and the stator-side supporting line.

5. An intermediate member provided between a motor which includes a stator-side member, and a motor attachment member to which the motor is attached, the intermediate member comprising:
    a plurality of stator-side support members to be coupled to the stator-side member; and
    a plurality of motor-attachment-member-side support members to be coupled to the motor attachment member, wherein vibration of the stator-side member vibrating in ring zeroth-mode is transmitted to the intermediate member through the plurality of stator-side support members, wherein a plurality of first portions having a first amplitude and a plurality of second portions having a second amplitude smaller then the first amplitude are formed in the intermediate member due to the transmission of the vibration of the stator-side member, the first portions and the second portions being alternately arranged in a circumferential direction of the intermediate member, and wherein the motor-attachment-member-side support members are arranged in the second portions.

6. A motor including a stator-side member and a rotor-side member, comprising:

an intermediate member arranged between the stator-side member and the rotor-side member;

a plurality of first support members for coupling the stator-side member and the intermediate member; and a plurality of second support members for coupling the intermediate member and a motor attachment member which supports the motor, wherein, when a first support member supporting line is defined as a line connecting a center of one of the plurality of first support member with a rotation center of the rotor-side member, and when a center line is defined as a line evenly dividing an included angle made by the first support member supporting line and another first support member supporting line adjacent to the first support member supporting line, each of the second support members is arranged in the intermediate member within an angular region formed between the center line and the first support member supporting line.

* * * * *